US012639043B2

(12) United States Patent
Seshagiri et al.

(10) Patent No.: US 12,639,043 B2
(45) Date of Patent: May 26, 2026

(54) IDENTIFYING ARTIFICIAL INTELLIGENCE FOR INFORMATION TECHNOLOGY OPERATIONS SOLUTION FOR RESOLVING ISSUES

(71) Applicant: International Business Machines Corporation, Armonk, NY (US)

(72) Inventors: Sudhakar T. Seshagiri, Bangalore (IN); Shwetha Gopalakrishna, Bangalore (IN); Jasbir Jassi, Bangalore (IN); Prasanna Alur Mathada, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 18/369,685

(22) Filed: Sep. 18, 2023

(65) Prior Publication Data

US 2025/0094131 A1 Mar. 20, 2025

(51) Int. Cl.
*G06F 8/10* (2018.01)
*G06N 20/00* (2019.01)

(52) U.S. Cl.
CPC .............. *G06F 8/10* (2013.01); *G06N 20/00* (2019.01)

(58) Field of Classification Search
CPC .................................. G06F 8/10; G06N 20/00
USPC ............................... 717/101–121; 706/21–45
See application file for complete search history.

(56) References Cited

U.S. PATENT DOCUMENTS 7,472,374 B1 * 12/2008 Dillman ................... G06F 8/10
717/102
8,788,525 B2 * 7/2014 Neels ................... G06F 16/248
707/765

9,286,413 B1 * 3/2016 Coates ................. G06F 16/903
9,916,233 B1 * 3/2018 Qureshi ............. G06F 11/3688
10,162,740 B1 * 12/2018 Setty ................... G06F 9/44505
(Continued)

FOREIGN PATENT DOCUMENTS

CN 112181960 A 1/2021

OTHER PUBLICATIONS

Diaz-De-Arcaya et al, "A Joint Study of the Challenges, Opportunities, and Roadmap of MLOps and AIOps: A Systematic Survey", ACM, pp. 1-30 (Year: 2023).*

(Continued)

*Primary Examiner* — Anil Khatri
(74) *Attorney, Agent, or Firm* — Kristofer Haggerty

(57) ABSTRACT

Described are techniques for identifying an optimal AIOps solution for resolving issues. An alert to resolve a software development and/or information technology problem is routed to a secondary responder to handle after a primary responder failed to resolve the alert. Key performance indicators in handling the alert for both the primary and secondary responders may then determined. A determination is then made as to how the secondary responder performed in handling the alert in comparison to the primary responder based on the key performance indicators. The results of such a determination are stored as metadata. Furthermore, the matching portions of the runbooks used by the primary and secondary responders are identified and stored as metadata. The machine learning model is then trained to select the best runbook to be used by the secondary responder to handle future alerts based on the saved metadata and the metadata of the corresponding alerts.

20 Claims, 6 Drawing Sheets

(56)        References Cited

U.S. PATENT DOCUMENTS

| | | | | |
|---|---|---|---|---|
| 10,635,409 | B2 * | 4/2020 | Pradhan | G06N 3/0499 |
| 11,029,947 | B2 * | 6/2021 | Jayaraman | G06F 17/16 |
| 11,157,246 | B2 * | 10/2021 | Zhang | G06N 3/08 |
| 11,340,898 | B1 * | 5/2022 | Sabharwal | G06F 8/30 |
| 11,593,709 | B2 * | 2/2023 | Singh | G06N 5/045 |
| 11,818,087 | B1 * | 11/2023 | Palki | H04L 51/18 |
| 11,900,075 | B2 * | 2/2024 | Prasad Tanniru | G06F 8/60 |
| 12,158,884 | B1 * | 12/2024 | Marchetti | G06F 16/2438 |
| 12,254,295 | B2 * | 3/2025 | Falcon | G06F 8/10 |
| 12,265,922 | B1 * | 4/2025 | Srinivasan | G06N 5/04 |
| 12,380,432 | B1 * | 8/2025 | Chan | G06Q 20/123 |
| 2009/0112860 | A1 * | 4/2009 | Yuasa | G06F 11/079 |
| 2016/0044380 | A1 | 2/2016 | Barrett | |
| 2022/0067627 | A1 | 3/2022 | Cao et al. | |
| 2022/0308865 | A1 | 9/2022 | Chivukula et al. | |
| 2023/0385042 | A1 * | 11/2023 | Obando Chacon | G06F 8/443 |

OTHER PUBLICATIONS

Wu et al, "Research on Artificial Intelligence Enhancing Internet of Things Security: A Survey", IEEE, pp. 1-23 (Year: 2020).*

Teggi et al, "AIOPs based Predictive Alerting for System Stability in IT Environment", IEEE, pp. 1-7 (Year: 2022).*

Saputri et al, "The Application of Machine Learning in Self-Adaptive Systems: A Systematic Literature Review", IEEE, pp. 1-20 (Year: 2020).*

Lyu et al, "On the Model Update Strategies for Supervised Learning in AIOps Solutions", ACM, pp. 1-39 (Year: 2024).*

Microsoft, "Azure Bot Service," https://azure.microsoft.com/en-in/products/bot-services, 2022, pp. 1-7.

Freshworks, "Freshservice Blog," https://www.freshworks.com/freshservice/blog/articles/?q=freshservice/itsm/itsm-trends-servicedesk-future-blog, 2022, pp. 1-5.

Cisco, "Webex Contact Center AI Solutions," https://www.cisco.com/c/en/us/products/contact-center/artificial-Intelligence.html, 2022, pp. 1-6.

Stanislav Ashmanov, "Why Does AI ≠ ML? Considering the Examples of Chatbots Creation," https://towardsdatascience.com/why-does-ai-ml-considering-the-examples-of-chatbots-creation-20b1906274f8, Oct. 3, 2018, pp. 1-19.

Michael O'Connell, "AI on Demand: Data Science in Operations," https://www.tibco.com/blog/2019/03/01/ai-on-demand-data-science-in-operations, Mar. 1, 2019, pp. 1-3.

IPCOM, "A System and Method to Compute the Best DevOps Solution by Targeting the Raise in Key Performance Index, Which Redirects to a Better Net Promoter Score," IP.com, IP.com No. IPCOM000265230D, Mar. 17, 2021, pp. 1-5.

* cited by examiner

ROUTING ENGINE ~201

MEASUREMENT ENGINE ~202

RUNBOOK SELECTOR ENGINE ~203

COMPARISON MODULE ~204

MATCHING ENGINE ~205

MAP CREATOR ENGINE ~206

MACHINE LEARNING ENGINE ~207

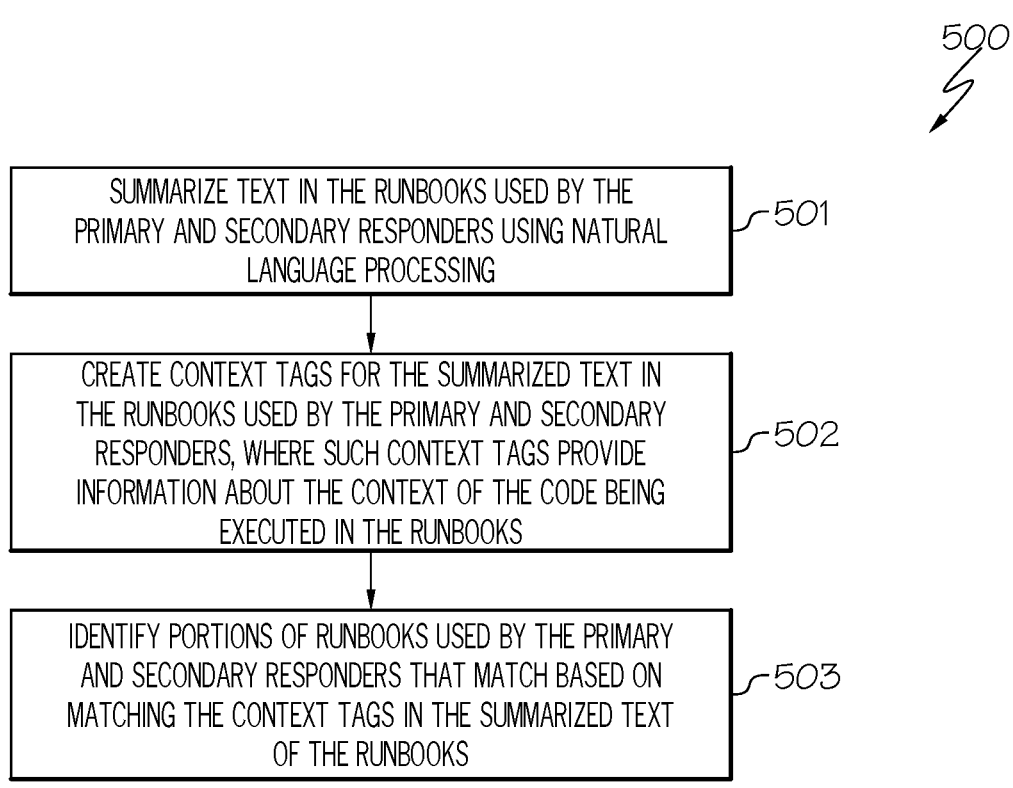

500

SUMMARIZE TEXT IN THE RUNBOOKS USED BY THE PRIMARY AND SECONDARY RESPONDERS USING NATURAL LANGUAGE PROCESSING — 501

CREATE CONTEXT TAGS FOR THE SUMMARIZED TEXT IN THE RUNBOOKS USED BY THE PRIMARY AND SECONDARY RESPONDERS, WHERE SUCH CONTEXT TAGS PROVIDE INFORMATION ABOUT THE CONTEXT OF THE CODE BEING EXECUTED IN THE RUNBOOKS — 502

IDENTIFY PORTIONS OF RUNBOOKS USED BY THE PRIMARY AND SECONDARY RESPONDERS THAT MATCH BASED ON MATCHING THE CONTEXT TAGS IN THE SUMMARIZED TEXT OF THE RUNBOOKS — 503

FIG. 5

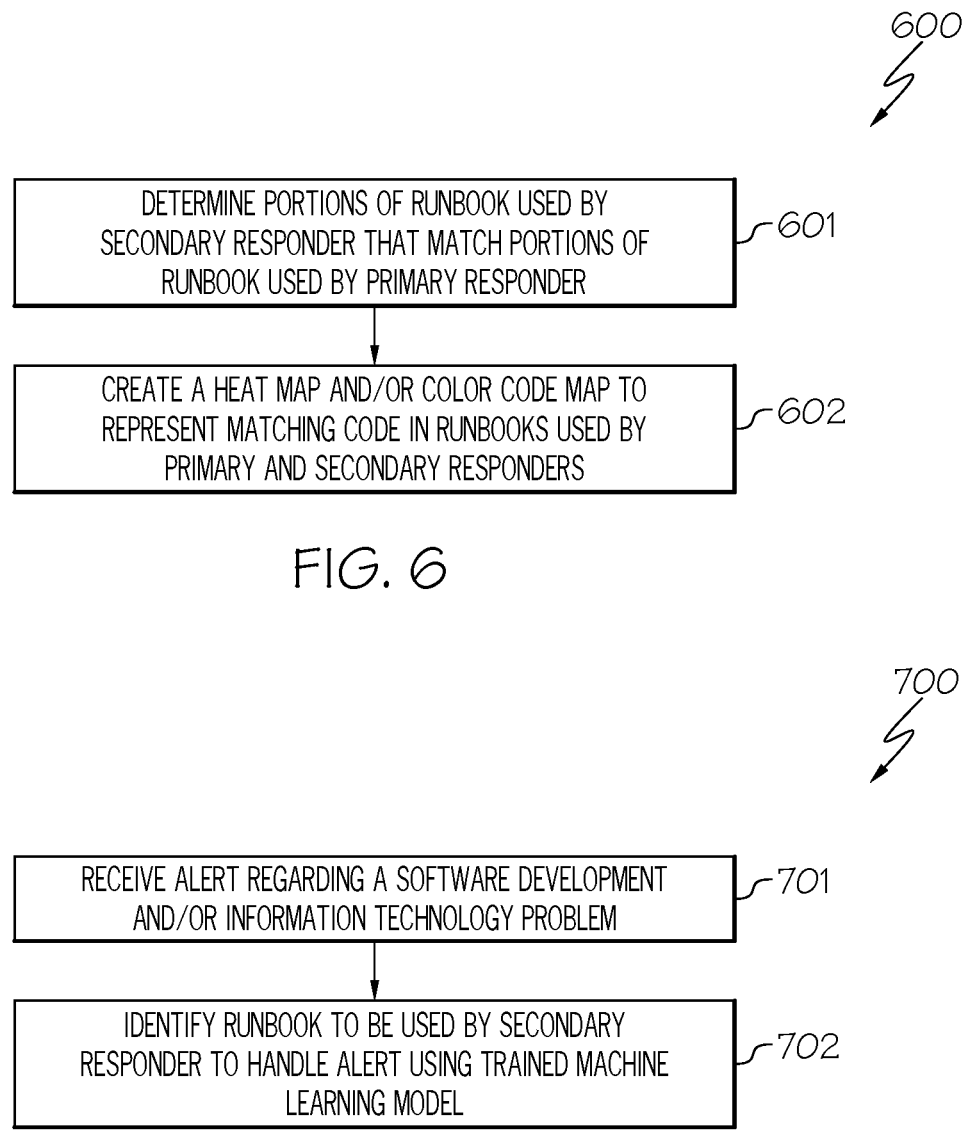

_600_

DETERMINE PORTIONS OF RUNBOOK USED BY
SECONDARY RESPONDER THAT MATCH PORTIONS OF
RUNBOOK USED BY PRIMARY RESPONDER    _601_

CREATE A HEAT MAP AND/OR COLOR CODE MAP TO
REPRESENT MATCHING CODE IN RUNBOOKS USED BY
PRIMARY AND SECONDARY RESPONDERS    _602_

RECEIVE ALERT REGARDING A SOFTWARE DEVELOPMENT
AND/OR INFORMATION TECHNOLOGY PROBLEM    _701_

IDENTIFY RUNBOOK TO BE USED BY SECONDARY
RESPONDER TO HANDLE ALERT USING TRAINED MACHINE
LEARNING MODEL    _702_

FIG. 7

IDENTIFYING ARTIFICIAL INTELLIGENCE FOR INFORMATION TECHNOLOGY OPERATIONS SOLUTION FOR RESOLVING ISSUES

TECHNICAL FIELD

The present disclosure relates generally to artificial intelligence for information technology operations (AIOps), and more particularly to identifying an AIOps solution for resolving issues, such as software development and/or information technology problems, based on key performance indicators.

BACKGROUND

Artificial intelligence for information technology operations (AIOps) is the application of artificial intelligence (AI) capabilities, such as natural language processing and machine learning models, to automate and streamline operational workflows. Such operation tasks include automation, performance monitoring, and event correlations among others.

SUMMARY

In one embodiment of the present disclosure, a computer-implemented method for identifying an artificial intelligence for information technology operations (AIOps) solution for resolving issues comprises routing an alert to resolve a software development and/or information technology problem to a secondary responder in response to a primary responder unsuccessfully handling the software development and/or the information technology problem, where the primary responder corresponds to a human responder, where the secondary responder corresponds to a bot. The method further comprises determining key performance indicators in handling the software development and/or the information technology problem by the primary and secondary responders. The method additionally comprises determining how the secondary responder performed in handling the software development and/or the information technology problem in comparison to the primary responder based on the determined key performance indicators. Furthermore, the method comprises storing the determination as a first set of metadata. Additionally, the method comprises training a machine learning model using the first set of metadata to select an appropriate runbook by the secondary responder to handle future software development and/or information technology problems.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which:

FIG. 5 is a flowchart of a method for identifying the matching portions of the runbooks used by the primary and secondary responders in accordance with an embodiment of the present disclosure;

FIG. 6 is a flowchart of a method for illustrating the matching code in the runbooks used by the primary and secondary responders in accordance with an embodiment of the present disclosure; and FIG. 7 is a flowchart of a method for selecting a runbook to be utilized by the secondary responder using a trained machine learning model in accordance with an embodiment of the present disclosure.

DETAILED DESCRIPTION

Figure 1:
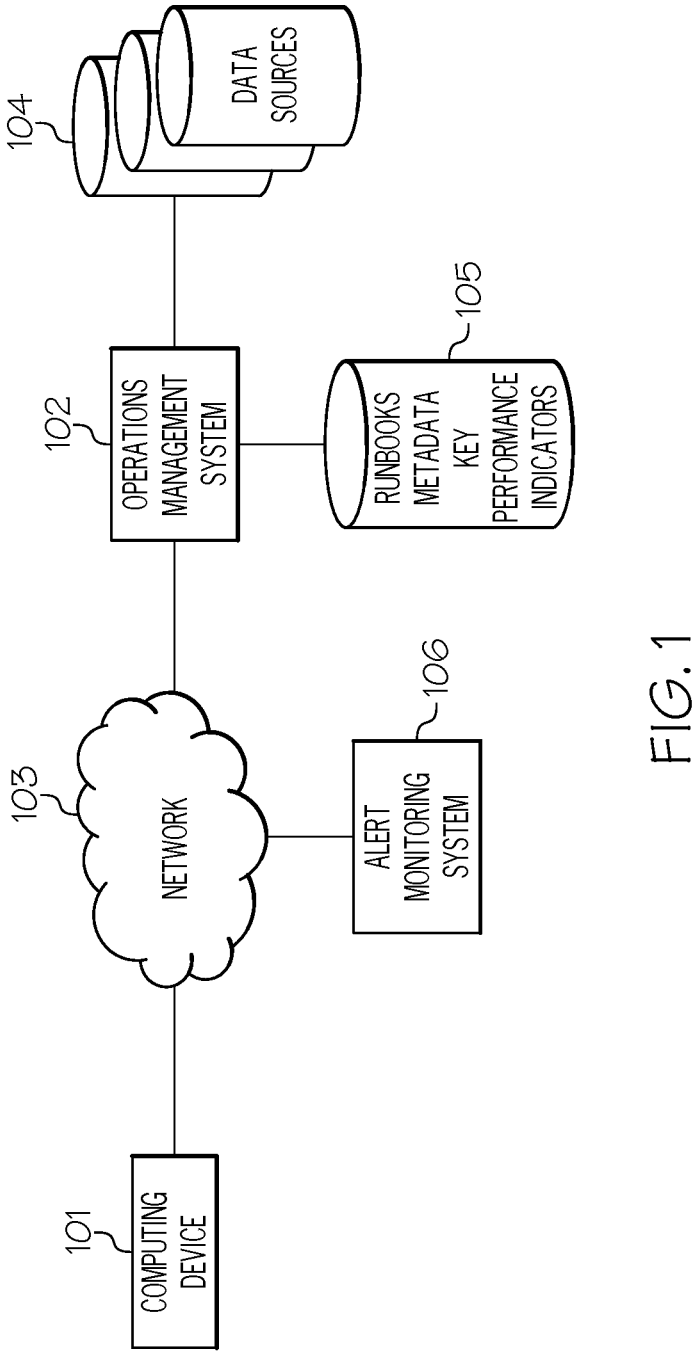
FIG. 1 illustrates an embodiment of the present disclosure of a communication system for practicing the principles of the present disclosure.
Figure 1:

As stated above, artificial intelligence for information technology operations (AIOps) is the application of artificial intelligence (AI) capabilities, such as natural language processing and machine learning models, to automate and streamline operational workflows. Such operation tasks include automation, performance monitoring, and event correlations among others.

Specifically, AIOps use big data, analytics, and machine learning capabilities to collect and aggregate the huge and ever-increasing volumes of data generated by multiple information technology (IT) infrastructure components, application demands, and performance-monitoring tools, and service ticketing systems. Furthermore, AIOps intelligently shift "signals" out of the "noise" to identify significant events and patterns related to application performance and availability issues. Additionally, AIOps diagnose root causes and report them to IT and DevOps for rapid response and remediation, or, in some cases, automatically resolve these issues without human intervention. Such issues may correspond to ensuring that metrics specified in a service level agreement are met. DevOps integrate and automate the work of software development (Dev) and IT operations (Ops) as a means for improving and shortening the systems development life cycle.

Currently, issues needing to be addressed, usually reported via alerts, are handled automatically via the system, which will resolve the alerts via defined steps, or, alternatively, are handled by a human DevOps engineer following a runbook. A runbook is a set of standardized written procedures for completing repetitive information technology (IT) processes within a company. Runbooks provide IT teams with contextual documents that increase consistency and efficiency through standardization. They act as a walk-through or step-by-step guide for both new and experienced IT professionals within the team.

Unfortunately, the resolution of such alerts via such means (human DevOps engineer and automated system) may not provide the fastest, best case resolution of the alerts in the AIOps operations life cycle, such as ensuring that metrics specified in the service level agreement are met.

The embodiments of the present disclosure provide a means for providing the fastest, best case resolution of the alerts in the AIOps operations life cycle by resolving issues, such as software development and/or information technology problems, by bots based on key performance indicators. In one embodiment, a machine learning model is trained to select the appropriate runbook to be used by a responder, such as a bot, to handle software development and/or information technology problems. A bot, as used herein, refers to a software program that performs automated, repetitive, pre-defined tasks. In one embodiment, such a machine learning model is trained by routing an alert (alert to resolve a software development and/or information technology problem) to a secondary responder (e.g., bot) to handle the alert if the primary responder is unsuccessful in handling the alert. In one embodiment, such an alert is handled or attempted to be handled by the primary and secondary responders by selecting a runbook and implementing the steps specified in the runbook. A runbook, as used herein, is a set of standardized written procedures for completing repetitive information technology (IT) processes. Such procedures may be implemented via software code. Key performance indicators in handling the alert by both responders are then determined. A key performance indicator, as used herein, is a quantifiable measure of performance over time for a specific objective. Examples of key performance indicators include case resolution time, a percentage of times a first selected runbook correctly resolved the problem ("accuracy"), a time it took to implement a correct runbook to resolve the problem ("wait time"), an amount of time it took in selecting a correct runbook to resolve the problem and the time taken to run the commands from the runbook to resolve the problem ("handling time"), a percentage of times a selected runbook avoided escalations, etc. A determination may then be made as to how the secondary responder performed in handling the alert in comparison to the primary responder based on such key performance indicators. The results of such a determination are stored as metadata. Furthermore, matching portions in the runbooks used by primary and secondary responders to handle the alert are identified to determine the extent that both responders used the same approach for resolving the alert. The identifying matching portions in the runbooks used by the primary and secondary responders are stored as metadata. The metadata discussed above is then provided to a repository and used, along with the metadata of the corresponding alerts, to train a machine learning model to select the best runbooks to be used by the secondary responder to handle future similar alerts. The "best" runbook, as used herein, refers to the runbook that was deemed by the machine learning model to be the most appropriate runbook to be utilized by a responder (e.g., secondary responder) to handle an alert. In this manner, the optimal AIOps solution in terms of the rules specified in the appropriately selected runbooks for resolving issues, such as software development and/or information technology problems, is identified. A further discussion regarding these and other features is provided below.

In some embodiments of the present disclosure, the present disclosure comprises a computer-implemented method, system, and computer program product for identifying an AIOps solution for resolving issues. In one embodiment of the present disclosure, an alert to resolve a software development and/or information technology problem is routed to a secondary responder (e.g., bot) to handle after a primary responder (e.g., human DevOps engineer) failed to resolve the alert. In one embodiment, a runbook is selected to be used by the secondary responder to handle such an alert based on identifying the runbook with the greatest number of context tags that match the metadata of the alert. Key performance indicators in handling the alert for both the primary and secondary responders may then be determined. A key performance indicator, as used herein, is a quantifiable measure of performance over time for a specific objective. Examples of key performance indicators include case resolution time, a percentage of times a first selected runbook correctly resolved the problem ("accuracy"), a time it took to implement a correct runbook to resolve the problem ("wait time"), an amount of time it took in selecting a correct runbook to resolve the problem and the time taken to run the commands from the runbook to resolve the problem ("handling time"), a percentage of times a selected runbook avoided escalations, etc. A determination is then made as to how the secondary responder (e.g., bot) performed in handling the alert regarding a software development and/or information technology problem in comparison to the primary responder (e.g., human DevOps engineer) based on the key performance indicators. For example, such key performance indicators for the primary responder may indicate a case resolution time of 5.22 seconds, a handling time of 4 seconds, an accuracy rating of 42%, and an escalation avoidance rate of 80%. Furthermore, in connection with the same example, the key performance indicators for the secondary responder may indicate a case resolution time of 3.22 seconds, a handling time of 2 seconds, an accuracy rating of 62%, and an escalation avoidance rate of 82%. The results of such a determination are stored as metadata, such as in a repository. Furthermore, the matching portions of the runbooks used by the primary and secondary responders are identified to determine the extent that both responders used the same approach for resolving the alert regarding a software development and/or information technology problem. Such identified matching portions may also be stored as metadata. The machine learning model is then trained to select the best runbook to be used by the secondary responder to handle future alerts based on the saved metadata and the metadata (e.g., instrumentation data, environmental data, continuous integration/continuous deployment (CI/CD) performance, version control in test automation, security issues, etc.) of the corresponding alerts. The "best" runbook, as used herein, refers to the runbook that was deemed by the machine learning model to be the most appropriate runbook to be utilized by a responder (e.g., secondary responder) to handle an alert. For example, the metadata of the alert is used by the trained machine learning model to identify the appropriate runbook for the secondary responder to utilize to handle the new incoming alert. In this manner, the optimal AIOps solution for resolving an alert regarding a software development and/or information technology problem is identified.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes a computing device 101 connected to an operations management system 102 via a network 103.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and operations management system 102. It is noted that both computing device 101 and the user, such as a DevOps engineer, of computing device 101 may be identified with element number 101.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, operations management system 102 utilizes AIOps tools to bring together data from multiple data sources 104. In one embodiment, such data sources 104 are disparate data sources including, but not limited to, data warehouses, data marts, and/or data lakes. Other examples include, but not limited to, database and legacy systems, cloud, hybrid and on-premises environments, sales and marketing applications, mobile devices and applications, customer relationship management (CRM) systems, data storage platforms, and analytics tools.

In one embodiment, operations management system 102 captures large data sets of any type from data sources 104 across the environment while maintaining data fidelity for comprehensive analysis.

Furthermore, in one embodiment, operations management system 102 collects all formats of big data (data that contains greater variety, arriving in increasing volumes and with more velocity) in varying velocity and volume from data sources 104. Operations management system 102 then applies automated advanced analytics on that data to predict and prevent future issues and identify the cause of existing issues that enable better decision making.

In one embodiment, operations management system 102 combines big data and machine learning to support IT operations through the scalable ingestion and analysis of data generated. Furthermore, operations management system 102 enables the concurrent use of multiple data sources 104, data collection methods, and analytical and presentation technologies.

Additionally, in one embodiment, operations management system 102 ingests data from multiple data sources 104 agnostic to the source or vendor. In one embodiment, operations management system 102 performs real-time analysis at the point of ingestion. Additionally, in one embodiment, operations management system 102 performs historical analysis of the stored data. Furthermore, in one embodiment, operations management system 102 leverages machine learning. Additionally, in one embodiment, operations management system 102 initiates an action or next step based on insights and analytics.

Furthermore, in one embodiment, operations management system 102 provides the fastest, best case resolution of the alerts in the AIOps operations life cycle by resolving issues, such as software development and/or information technology problems, by bots based on key performance indicators. An "alert," as used herein, refers to an indication that a predefined event has occurred that needs to be addressed, such as by the primary responder (e.g., a DevOps engineer, such as the user of computing device 101) or a secondary responder (e.g., a bot). For example, an alert may be directed to resolve a software development and/or information technology problem (e.g., software requirements, security breaches, software bugs, slow performance, overheating, slow Internet connection, etc.).

Additionally, in one embodiment, operations management system 102 trains a machine learning model to select the appropriate runbook to be used by a responder, such as a bot, to handle software development and/or information technology problems. A bot, as used herein, refers to a software program that performs automated, repetitive, pre-defined tasks. In one embodiment, such a machine learning model is trained by routing an alert (alert to resolve a software development and/or information technology problem) to the secondary responder (e.g., bot) to handle the alert after being unsuccessfully handled by the primary responder (e.g., human DevOps engineer). In one embodiment, such an alert is handled or attempted to be handled by selecting a runbook and implementing the steps specified in the runbook. A runbook, as used herein, is a set of standardized written procedures for completing repetitive information technology (IT) processes. In one embodiment, such runbooks are stored in database 105 connected to operations management system 102. In one embodiment, such procedures may be implemented via software code.

In one embodiment, operations management system 102 determines the key performance indicators in handling the alert for both responders. A key performance indicator, as used herein, is a quantifiable measure of performance over time for a specific objective. Examples of key performance indicators include case resolution time, a percentage of times a first selected runbook correctly resolved the problem ("accuracy"), a time it took to implement a correct runbook to resolve the problem ("wait time"), an amount of time it took in selecting a correct runbook to resolve the problem and the time taken to run the commands from the runbook to resolve the problem ("handling time"), a percentage of times a selected runbook avoided escalations, etc.

In one embodiment, operations management system 102 determines how the secondary responder performed in handling the alert in comparison to the primary responder based on such key performance indicators. The results of such a determination are stored as metadata, such as in repository 105.

Furthermore, in one embodiment, operations management system 102 identifies the matching and non-matching portions in the runbooks used by the primary and secondary responders to handle the alert to determine the extent that both responders used the same approach for resolving the alert. The identified matching and non-matching portions in the runbooks used by the primary and secondary responders are stored as metadata. Such metadata is then provided to a repository, such as repository 105.

In one embodiment, operations management system 102 uses the metadata stored in repository 105 discussed above, as well as the metadata (e.g., instrumentation data, environmental data, continuous integration/continuous deployment (CI/CD) performance, version control in test automation, security issues, etc.) of the corresponding alerts, to train a machine learning model to select the best runbooks to be used by the secondary responder to handle future similar alerts. The "best" runbook, as used herein, refers to the runbook that was deemed by the machine learning model to be the most appropriate runbook to be utilized by a responder (e.g., secondary responder) to handle an alert. In this manner, the optimal AIOps solutions in terms of the rules specified in appropriately selected runbooks for resolving issues, such as software development and/or information technology problems, are identified.

Furthermore, in one embodiment, operations management system 102 creates a heat map and/or a color code map to represent the matching code in the runbooks used by the primary and secondary responders. For example, the color red may represent code that matches; whereas, the color blue may represent code that does not match. In one embodiment, matching is determined by vectorizing the code of the runbooks used by the primary and secondary responders, such as via Word2vec, Doc2Vec, GloVe, etc. After being converted into real-valued vectors, a similarity measure, such as cosine similarity or the Euclidean distance, may be used to determine the similarity between the code of the runbooks. Such a similarity measure is compared to a threshold value, which may be user-designated, to determine if the code of the runbooks is within a threshold degree of similarity to one another. If the similarity measure exceeds such a threshold value, then the code of the runbooks are deemed to be within a threshold degree of similarity. Otherwise, the code of the runbooks are not deemed to be within the threshold degree of similarity.

Referring again to FIG. 1, as discussed above, repository 105 stores runbooks. In one embodiment, repository 105 additionally stores metadata pertaining to how the secondary responder (e.g., bot) performed in handling an alert regarding the software development and/or information technology problem in comparison to the primary responder (e.g., DevOps engineer, such as the user of computing device 101). Furthermore, in one embodiment, repository 105 stores metadata pertaining to the matching portions of the runbooks used by the primary and secondary responders. In one embodiment, such metadata stored in repository 105 is used to train a machine learning model to select the best runbook to be used by the secondary responder (e.g., bot) to handle future alerts.

Furthermore, in one embodiment, repository 105 stores the key performance indicators in handling the alert by the primary and secondary responders. In one embodiment, such key performance indicators are used in determining which runbook should be assigned to the primary and/or secondary responder to handle an alert.

A more detailed description of these and other features will be provided further below. Furthermore, a description of the software components of operations management system 102 used for identifying an optimal AIOps solution to an alert regarding a software development and/or information technology problem is provided below in connection with FIG. 2. A description of the hardware configuration of operations management system 102 is provided further below in connection with FIG. 3.

Furthermore, as shown in FIG. 1, system 100 includes an alert monitoring system 106 connected to network 103. In one embodiment, alert monitoring system 106 is configured to monitor events that occur in the system, including data sources 104, being managed by operations management system 102. In one embodiment, such events may correspond to changes in metric values, such as exceeding or not exceeding a metric specified in a service level agreement. In one embodiment, alert monitoring system 106 is configured to generate an alert based on such monitored events, such as when such events indicate a change in a metric value exceeding or not exceeding a metric specified in a service level agreement. In one embodiment, such events to be monitored as well as the change in metric values associated with such events that should generate an alert by alert monitoring system 106 are stored in a data structure (e.g., table). Based on the events listed in such a data structure, alert monitoring system 106 monitors for such events, including changes in the metric values associated with such events that should generate an alert by alert monitoring system 106 as specified in the data structure. In one embodiment, such a data structure resides within a storage device of alert monitoring system 106. In one embodiment, such a data structure is populated by an expert.

In one embodiment, alert monitoring system 106 is configured to generate metadata associated with the alert, such as instrumentation data, environmental data, continuous integration/continuous deployment (CI/CD) performance, version control in test automation, security issues, etc. In one embodiment, such metadata is provided to operations management system 102 and stored in a storage device of operations management system 102.

System 100 is not to be limited in scope to any one particular network architecture. System 100 may include any number of computing devices 101, operations management systems 102, networks 103, data sources 104, databases 105, and alert monitoring systems 106.

A discussion regarding the software components used by operations management system 102 to identify an optimal AIOps solution to an alert to resolve a software development and/or information technology problem is provided below in connection with FIG. 2.

Figure 2:
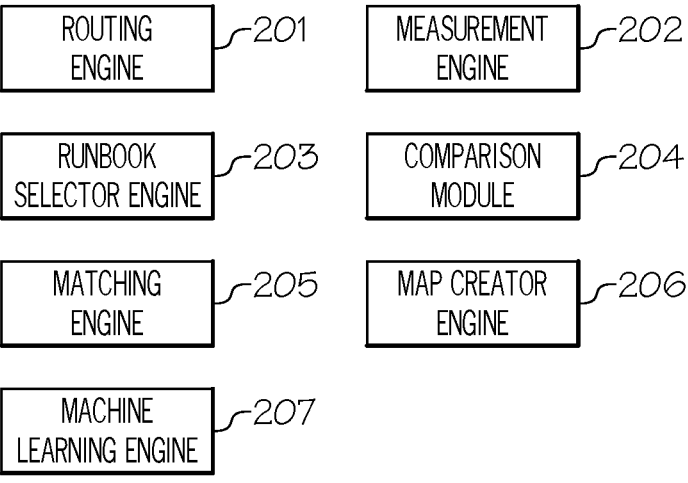
FIG. 2 is a diagram of the software components used by the operations management system to identify an optimal AIOps solution to an alert to resolve a software development and/or information technology problem in accordance with an embodiment of the present disclosure.

FIG. 2 is a diagram of the software components used by operations management system 102 (FIG. 1) to identify an optimal AIOps solution to an alert to resolve a software development and/or information technology problem in accordance with an embodiment of the present disclosure.

Referring to FIG. 2, in conjunction with FIG. 1, operations management system 102 includes a routing engine 201 configured to receive an alert regarding a software development and/or information technology problem to be resolved, such as a DevOps problem or a site reliability engineer problem.

Examples of such software development and/or information technology problems include software requirements, security breaches, software bugs, slow performance, overheating, slow Internet connection, etc.

In one embodiment, an alert is generated by alert monitoring system 106 based on changes in metric values pertaining to a software development and/or information technology problem, such as exceeding or not exceeding a metric specified in a service level agreement.

As stated above, alert monitoring system 106 is configured to monitor events that occur in the system, including data sources 104, being managed by operations management system 102. In one embodiment, such events may correspond to changes in metric values, such as exceeding or not exceeding a metric specified in a service level agreement. In one embodiment, alert monitoring system 106 is configured to generate an alert based on such monitored events, such as when such events indicate a change in a metric value exceeding or not exceeding a metric specified in a service level agreement. In one embodiment, such events to be monitored as well as the change in metric values associated with such events that should generate an alert by alert monitoring system 106 are stored in a data structure (e.g., table). Based on the events listed in such a data structure, alert monitoring system 106 monitors for such events, including changes in the metric values associated with such events that should generate an alert by alert monitoring system 106 as specified in the data structure. In one embodiment, such a data structure resides within a storage device of alert monitoring system 106. In one embodiment, such a data structure is populated by an expert.

In one embodiment, routing engine 201 routes the alert regarding the software development and/or information technology problem to be resolved to the primary responder (e.g., DevOps engineer, such as the user of computing device 101) to handle.

Routing engine 201 then determines if the alert was successfully handled by the primary responder. That is, routing engine 201 determines whether the software development and/or information technology problem associated with the alert was successfully handled by the primary responder. "Successfully handled," as used herein, refers to resolving the alert, such as addressing the software development and/or information technology problem in a manner that causes alert monitoring system 106 to withdraw the alert.

If the alert was successfully handled by the primary responder, then measurement engine 202 of operations management system 102 determines the key performance indicators in handling the software development and/or information technology problem. A key performance indicator, as used herein, is a quantifiable measure of performance over time for a specific objective. Examples of key performance indicators determined by measurement engine 202 is discussed below.

For example, measurement engine 202 identifies the resolution time for resolving the alert regarding a software development and/or information technology problem. In one embodiment, the resolution time corresponds to the time from when the alert was initiated until the time that the alert regarding a software development and/or information technology problem was resolved.

In another example, measurement engine 202 identifies the handling time for the duration of time it took in selecting the correct runbook to resolve the alert regarding a software development and/or information technology problem and the time taken to run commands from the runbook to correct the software development and/or information technology problem.

In a further example, measurement engine 202 identifies the accuracy (accuracy rating) in terms of identifying the percentage of times the selected first runbook is the correct runbook for resolving the alert regarding a software development and/or information technology problem. In one embodiment, such a percentage may correspond to the number of times the correct runbook was utilized divided by the number of times the recommendations were made (number of times a runbook was selected to address the alert).

In another example, measurement engine 202 identifies the percentage of times the selected runbook avoids escalations (an increase in seriousness in the software development and/or information technology problem) corresponding to the escalation avoidance rate. In one embodiment, such a percentage may correspond to the number of times the selected runbook avoided escalations divided by the number of times the recommendations were made (number of times a runbook was selected to address the alert).

In one embodiment, measurement engine 202 utilizes various software tools for identifying the key performance indicators in handling the alert regarding a software development and/or information technology problem, which can include, but are not limited to, Domo®, Tableau®, Klipfolio®, Databox®, etc.

In one embodiment, after computing such key performance indicators, measurement engine 202 routes such key performance indicators to repository 105, which will later be used in connection with training a machine learning model to select the best runbook for the secondary responder to utilize in handling a specific alert.

If, however, the alert was not successfully handled by the primary responder, then routing engine 201 routes the alert regarding the software development and/or information technology problem to the secondary responder (e.g., bot) to handle.

Operations management system 102 further includes a runbook selector engine 203 configured to select the runbook to be used by the secondary responder (e.g., bot) to handle the alert regarding the software development and/or information technology problem.

In one embodiment, runbook selector engine 203 summarizes the text in the runbooks stored in repositor 105 using natural language processing. In one embodiment, runbook selector engine 203 identifies the frequency of all the words in the runbooks and stores the text data and its frequency in a dictionary. The sentences which contain a number of frequency words that exceeds a threshold value, which may be user-designated, is kept in the final summary.

In one embodiment, runbook selector engine 203 creates context tags for the summarized text in the runbooks used by the primary and secondary responders, where such context tags provide information about the context of the code being executed in the runbooks. In one embodiment, such context tags are assigned automatically based on identifying keywords in the runbooks that are associated with context tags as specified in a data structure (e.g., table). For example, such a data structure may include a listing of keywords and their associated context tags. For instance, the keyword "console" or "GUI" may be associated with the context tag of "console." In another example, the keyword "setup" may be associated with the context tag of "setup." In a further example, the keyword "REST" may be associated with the context tag of "REST."

In one embodiment, runbook selector engine 203 selects the runbook to be used by the secondary responder (e.g., bot) based on identifying the runbook with the greatest number of context tags that match the metadata of the alert.

In one embodiment, alert monitoring system 106 is configured to generate metadata associated with the alert, such as instrumentation data, environmental data, continuous integration/continuous deployment (CI/CD) performance, version control in test automation, security issues, etc. In one embodiment, such metadata is provided to operations management system 102 and stored in a storage device of operations management system 102. In one embodiment, such metadata is used to identify the runbook with the greatest number of context tags that match the metadata of the alert.

Furthermore, in one embodiment, measurement engine 202 determines the key performance indicators in handling the alert by the secondary responder in the same manner as discussed above in connection with determining the key performance indicators in handling the alert regarding the software development and/or information technology problem by the primary responder.

Additionally, operations management system 102 includes a comparison module 204. Comparison module 204 is configured to determine how secondary responder (e.g., bot) performed in handling the alert regarding a software development and/or information technology problem in comparison to the primary responder (e.g., DevOps engineer, such as the user of computing device 101) based on the key performance indicators.

For example, such key performance indicators for the primary responder may indicate a case resolution time of 5.22 seconds, a handling time of 4 seconds, an accuracy rating of 42%, and an escalation avoidance rate of 80%. Furthermore, in connection with the same example, the key performance indicators for the secondary responder may indicate a case resolution time of 3.22 seconds, a handling time of 2 seconds, an accuracy rating of 62%, and an escalation avoidance rate of 82%.

In one embodiment, after computing such key performance indicators, measurement engine 202 routes such key performance indicators to repository 105.

In one embodiment, such key performance indicators for the primary and secondary responders are compared against one another by comparison module 204. In one embodiment, based on the optimal values for such key performance indicators as established by an expert in a data structure (e.g., table), which may be stored in a storage device of operations management system 102, comparison module 204 determines how the secondary responder performs in handling the alert in comparison to the primary responder.

In one embodiment, comparison module 204 compares the key performance indicators of the primary and secondary responders by dividing the nominal value of the key performance indicator in question for the secondary responder with respect to the nominal value of the same key performance indicator for the primary responder resulting in a "comparison value." In one embodiment, the nominal values for such key performance indicators for the primary and secondary responders may then be compared with the optimal values for such key performance indicators as stored in the data structure discussed above. If the optimal value for such a key performance indicator is greater than the values of the key performance indicator for the primary and secondary responders and if the comparison value is greater than 1, then the secondary responder is deemed to have performed better than the primary responder for such a key performance indicator. Otherwise, the primary responder is deemed to have performed better than the secondary responder for such a key performance indicator. If the optimal value for such a key performance indicator is less than the values of the key performance indicator for the primary and secondary responders and if the comparison value is greater than 1, then the primary responder is deemed to have performed better than the secondary responder for such a key performance indicator. Otherwise, the secondary responder is deemed to have performed better than the primary responder for such a key performance indicator.

Furthermore, in one embodiment, comparison module 204 determines whether the primary or secondary responder performed better with respect to a key performance indicator based on which value of the key performance indicator for the primary and secondary responders is closest to the optimal value of the key performance indicator as stored in the data structure discussed above. Whichever value of the key performance indicator for the primary and secondary responders is closest to the optimal value of the key performance indicator, such a responder is deemed to have performed better with respect to such a key performance indicator.

In one embodiment, comparison module 204 utilizes various software tools for determining how the secondary responder performed in handling the alert regarding a software development and/or information technology problem in comparison to the primary responder based on the key performance indicators, which can include, but are not limited to, Domo®, Tableau®, Klipfolio®, Databox®, etc.

In one embodiment, comparison module 204 stores the results of such a determination as metadata, such as in repository 105.

Furthermore, operations management system 102 includes a matching engine 205 configured to identify the matching portions of the runbooks used by the primary and secondary responders to determine the extent that both responders used the same approach for resolving the alert regarding a software development and/or information technology problem.

In one embodiment, matching engine 205 summarizes the text in the runbooks used by the primary and secondary responders using natural language processing. In one embodiment, matching engine 205 identifies the frequency of all the words in the runbooks and stores the text data and its frequency in a dictionary. The sentences which contain a number of frequency words that exceeds a threshold value, which may be user-designated, is kept in the final summary.

In one embodiment, matching engine 205 creates context tags for the summarized text in the runbooks used by the primary and secondary responders, where such context tags provide information about the context of the code being executed in the runbooks. In one embodiment, such context tags are assigned automatically based on identifying keywords in the runbooks that are associated with context tags as specified in a data structure (e.g., table). For example, such a data structure may include a listing of keywords and their associated context tags. For instance, the keyword "console" or "GUI" may be associated with the context tag of "console." In another example, the keyword "setup" may be associated with the context tag of "setup." In a further example, the keyword "REST" may be associated with the context tag of "REST."

In one embodiment, portions of runbooks used by the primary and secondary responders that match are identified based on matching the context tags in the summarized text of the runbooks.

Alternatively, in one embodiment, matching engine 205 identifies the matching portions of the runbooks used by the primary and secondary responders to determine the extent that both responders used the same approach for resolving the alert as well as to identify the differences in the approaches that allowed the secondary responder to successfully handle the alert by vectorizing the runbooks used by the primary and secondary responders. The matching portions of the runbooks used by the primary and secondary responders, as used herein, refer to the portions of the runbooks used by the primary and secondary responders that are within a threshold degree of similarity, which may be user-designated. In one embodiment, such a similarity may be determined by vectorizing the runbooks used by the primary and secondary responders. After being converted into real-valued vectors, a similarity measure, such as cosine similarity or the Euclidean distance, may be used to determine the similarity between the code of the runbooks. Such a similarity measure is compared to a threshold value, which may be user-designated, to determine if the portions of the runbooks used by the primary and secondary responders are within a threshold degree of similarity to one another. If the similarity measure exceeds such a threshold value, then the portions of the runbooks used by the primary and secondary responders are deemed to be within a threshold degree of similarity. Otherwise, the portions of the runbooks used by the primary and secondary responders are not deemed to be within a threshold degree of similarity "Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the portions of the runbooks used by the primary and secondary responders are deemed to be within a threshold degree of similarity. Otherwise, the portions of the runbooks used by the primary and secondary responders are not deemed to be within a threshold degree of similarity.

In one embodiment, the Euclidean distance is calculated as the square root of the sum of the squared differences between the two feature vectors. If the distance exceeds a threshold value, which may be user-designated, then the portions of the runbooks used by the primary and secondary responders are deemed to be within a threshold degree of similarity. Otherwise, the portions of the runbooks used by the primary and secondary responders are not deemed to be within a threshold degree of similarity.

In one embodiment, comparison module 204 stores the results of identifying matching portions as well as non-matching portions of the runbooks as metadata, such as in repository 105.

Furthermore, in one embodiment, in connection with determining the portions of the runbook used by the secondary responder (e.g., bot) that match the portions of the runbook used by the primary responder (e.g., DevOps engineer, such as the user of computing device 101), a map creator engine 206 of operations management system 102 creates a heat map and/or a color code map to represent the matching code and the non-matching code in the runbooks used by the primary and secondary responders.

In one embodiment, map creator engine 206 utilizes hex color codes in Python® for creating the heat map and/or the color code map. Such hex color codes are associated with colors corresponding to the degree that the portions of the runbooks used by the primary and secondary responders match and not match. Such a degree may be established by the similarity measure. For example, the darker shade of red may indicate a high degree of matching; whereas, a darker shade of blue may indicate a low degree of matching.

Operations management system 102 additionally includes a machine learning engine 207 configured to train a machine learning model using the saved metadata to select the best runbook to be used by the secondary responder to handle future alerts based on the metadata of the alert. The "best" runbook, as used herein, refers to the runbook that was deemed by the machine learning model to be the most appropriate runbook to be utilized by a responder (e.g., secondary responder) to handle an alert.

In one embodiment, machine learning engine 207 builds and trains a machine learning model to select the best runbook to be used by the secondary responder (e.g., bot) to handle future alerts based on the metadata of the alert.

In one embodiment, the machine learning model is trained to select the best runbook to be used by the secondary responder (e.g., bot) to handle future alerts based on a sample data set that includes a selected runbook with context tags matching the metadata of an alert (alert for a particular software development and/or information technology problem) based on the metadata for how the secondary responder performed in handling the alert in comparison to the primary responder, the metadata for the matching and non-matching portions of the runbooks used by the primary and secondary responders to resolve the alert regarding a software development and/or information technology problem, and the metadata of the alert regarding the software development and/or information technology problem. Such a sample data set may be stored in a data structure (e.g., table) residing within the storage device of operations management system 102. In one embodiment, such a data structure is populated by an expert.

Furthermore, in one embodiment, the sample data set discussed above is referred to herein as the "training data," which is used by a machine learning algorithm to make predictions or decisions as to the runbook to be selected to be used by the secondary responder to handle a received alert regrading a software development and/or information technology problem. The algorithm iteratively makes predictions on the training data as to the runbook to be selected to be used by the secondary responder to handle a received alert regrading a software development and/or information technology problem until the predictions achieve the desired accuracy as determined by an expert. Examples of such learning algorithms include nearest neighbor, Naïve Bayes, decision trees, linear regression, support vector machines, and neural networks.

Upon training the machine learning model, the trained machine learning model is used by runbook selector engine 203 to identify a runbook to be used by the secondary responder (e.g., bot) to handle a new alert based on the metadata of the alert.

As discussed above, in one embodiment, alert monitoring system 106 is configured to generate metadata associated with the alert, such as instrumentation data, environmental data, continuous integration/continuous deployment (CI/CD) performance, version control in test automation, security issues, etc. In one embodiment, such metadata is provided to operations management system 102 and stored in a storage device of operations management system 102.

In one embodiment, such metadata of the alert is used by the trained machine learning model to select the runbook to be used by the secondary responder to handle the alert.

A further description of these and other features is provided below in connection with the discussion of the method for identifying an optimal AIOps solution to an alert regarding a software development and/or information technology problem.

Prior to the discussion of the method for identifying an optimal AIOps solution to an alert regarding a software development and/or information technology problem, a description of the hardware configuration of operations management system 102 (FIG. 1) is provided below in connection with FIG. 3.

Figure 3:
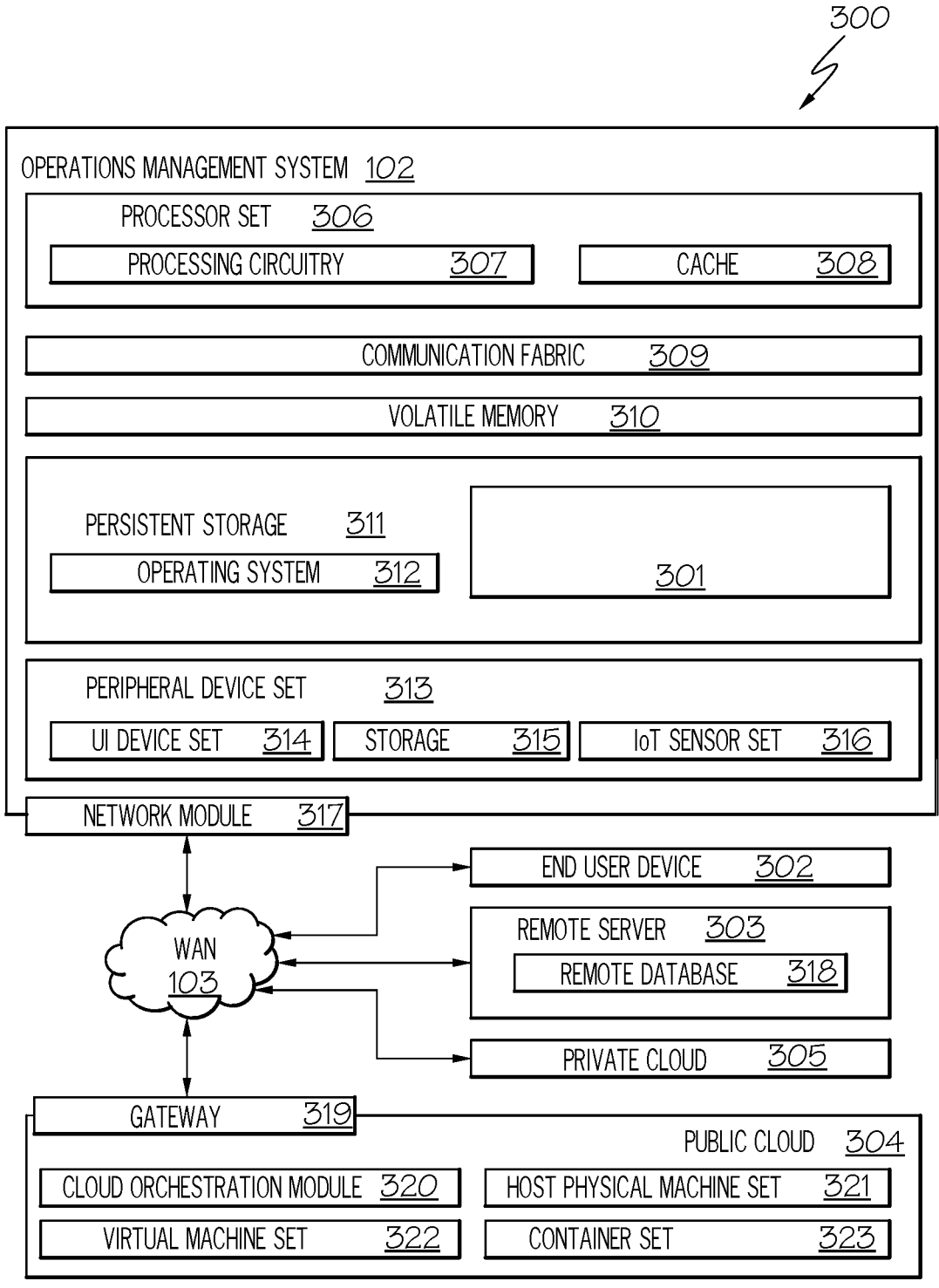
FIG. 3 illustrates an embodiment of the present disclosure of the hardware configuration of the operations management system which is representative of a hardware environment for practicing the present disclosure.

Referring now to FIG. 3, in conjunction with FIG. 1, FIG. 3 illustrates an embodiment of the present disclosure of the hardware configuration of operations management system 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 300 contains an example of an environment for the execution of at least some of the computer code (computer code for identifying an AIOps solution to an alert regarding a software development and/or information technology problem, which is stored in block 301) involved in performing the disclosed methods, such as identifying an AIOps solution to an alert regarding a software development and/or information technology problem. In addition to block 301, computing environment 300 includes, for example, operations management system 102, network 103, such as a wide area network (WAN), end user device (EUD) 302, remote server 303, public cloud 304, and private cloud 305. In this embodiment, operations management system 102 includes processor set 306 (including processing circuitry 307 and cache 308), communication fabric 309, volatile memory 310, persistent storage 311 (including operating system 312 and block 301, as identified above), peripheral device set 313 (including user interface (UI) device set 314, storage 315, and Internet of Things (IoT) sensor set 316), and network module 317. Remote server 303 includes remote database 318. Public cloud 304 includes gateway 319, cloud orchestration module 320, host physical machine set 321, virtual machine set 322, and container set 323.

Operations management system 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 318. As is well understood in the art of computer technology, and depending upon the technology, performance of a computer-implemented method may be distributed among multiple computers and/or between multiple locations. On the other hand, in this presentation of computing environment 300, detailed discussion is focused on a single computer, specifically operations management system 102, to keep the presentation as simple as possible. Operations management system 102 may be located in a cloud, even though it is not shown in a cloud in FIG. 3. On the other hand, operations management system 102 is not required to be in a cloud except to any extent as may be affirmatively indicated.

Processor set 306 includes one, or more, computer processors of any type now known or to be developed in the future. Processing circuitry 307 may be distributed over multiple packages, for example, multiple, coordinated integrated circuit chips. Processing circuitry 307 may implement multiple processor threads and/or multiple processor cores. Cache 308 is memory that is located in the processor chip package(s) and is typically used for data or code that should be available for rapid access by the threads or cores running on processor set 306. Cache memories are typically organized into multiple levels depending upon relative proximity to the processing circuitry. Alternatively, some, or all, of the cache for the processor set may be located "off chip." In some computing environments, processor set 306 may be designed for working with qubits and performing quantum computing.

Computer readable program instructions are typically loaded onto operations management system 102 to cause a series of operational steps to be performed by processor set 306 of operations management system 102 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 308 and the other storage media discussed below. The program instructions, and associated data, are accessed by processor set 306 to control and direct performance of the disclosed methods. In computing environment 300, at least some of the instructions for performing the disclosed methods may be stored in block 301 in persistent storage 311.

Communication fabric 309 is the signal conduction paths that allow the various components of operations management system 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 310 is any type of volatile memory now known or to be developed in the future. Examples include dynamic type random access memory (RAM) or static type RAM. Typically, the volatile memory is characterized by random access, but this is not required unless affirmatively indicated. In operations management system 102, the volatile memory 310 is located in a single package and is internal to operations management system 102, but, alternatively or additionally, the volatile memory may be distributed over multiple packages and/or located externally with respect to operations management system 102.

Persistent Storage 311 is any form of non-volatile storage for computers that is now known or to be developed in the future. The non-volatility of this storage means that the stored data is maintained regardless of whether power is being supplied to operations management system 102 and/or directly to persistent storage 311. Persistent storage 311 may be a read only memory (ROM), but typically at least a portion of the persistent storage allows writing of data, deletion of data and re-writing of data. Some familiar forms of persistent storage include magnetic disks and solid state storage devices. Operating system 312 may take several forms, such as various known proprietary operating systems or open source Portable Operating System Interface type operating systems that employ a kernel. The code included in block 301 typically includes at least some of the computer code involved in performing the disclosed methods.

Peripheral device set 313 includes the set of peripheral devices of operations management system 102. Data communication connections between the peripheral devices and the other components of operations management system 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 314 may include components such as a display screen, speaker, microphone, wearable devices (such as goggles and smart watches), keyboard, mouse, printer, touchpad, game controllers, and haptic devices. Storage 315 is external storage, such as an external hard drive, or insertable storage, such as an SD card. Storage 315 may be persistent and/or volatile. In some embodiments, storage 315 may take the form of a quantum computing storage device for storing data in the form of qubits. In embodiments where operations management system 102 is required to have a large amount of storage (for example, where operations management system 102 locally stores and manages a large database) then this storage may be provided by peripheral storage devices designed for storing very large amounts of data, such as a storage area network (SAN) that is shared by multiple, geographically distributed computers. IoT sensor set 316 is made up of sensors that can be used in Internet of Things applications. For example, one sensor may be a thermometer and another sensor may be a motion detector.

Network module 317 is the collection of computer software, hardware, and firmware that allows operations management system 102 to communicate with other computers through WAN 103. Network module 317 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 317 are performed on the same physical hardware device. In other embodiments (for example, embodiments that utilize software-defined networking (SDN)), the control functions and the forwarding functions of network module 317 are performed on physically separate devices, such that the control functions manage several different network hardware devices. Computer readable program instructions for performing the disclosed methods can typically be downloaded to operations management system 102 from an external computer or external storage device through a network adapter card or network interface included in network module 317.

WAN 103 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 302 is any computer system that is used and controlled by an end user (for example, a customer of an enterprise that operates operations management system 102), and may take any of the forms discussed above in connection with operations management system 102. EUD 302 typically receives helpful and useful data from the operations of operations management system 102. For example, in a hypothetical case where operations management system 102 is designed to provide a recommendation to an end user, this recommendation would typically be communicated from network module 317 of operations management system 102 through WAN 103 to EUD 302. In this way, EUD 302 can display, or otherwise present, the recommendation to an end user. In some embodiments, EUD 302 may be a client device, such as thin client, heavy client, mainframe computer, desktop computer and so on.

Remote server 303 is any computer system that serves at least some data and/or functionality to operations management system 102. Remote server 303 may be controlled and used by the same entity that operates operations management system 102. Remote server 303 represents the machine(s) that collect and store helpful and useful data for use by other computers, such as operations management system 102. For example, in a hypothetical case where operations management system 102 is designed and programmed to provide a recommendation based on historical data, then this historical data may be provided to operations management system 102 from remote database 318 of remote server 303.

Public cloud 304 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 304 is performed by the computer hardware and/or software of cloud orchestration module 320. The computing resources provided by public cloud 304 are typically implemented by virtual computing environments that run on various computers making up the computers of host physical machine set 321, which is the universe of physical computers in and/or available to public cloud 304. The virtual computing environments (VCEs) typically take the form of virtual machines from virtual machine set 322 and/or containers from container set 323. It is understood that these VCEs may be stored as images and may be transferred among and between the various physical machine hosts, either as images or after instantiation of the VCE. Cloud orchestration module 320 manages the transfer and storage of images, deploys new instantiations of VCEs and manages active instantiations of VCE deployments. Gateway 319 is the collection of computer software, hardware, and firmware that allows public cloud 304 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 305 is similar to public cloud 304, except that the computing resources are only available for use by a single enterprise. While private cloud 305 is depicted as being in communication with WAN 103 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 304 and private cloud 305 are both part of a larger hybrid cloud.

Block 301 further includes the software components discussed above in connection with FIG. 2 to identify an optimal AIOps solution to an alert regarding a software development and/or information technology problem. In one embodiment, such components may be implemented in hardware. The functions discussed above performed by such components are not generic computer functions. As a result, operations management system 102 is a particular machine that is the result of implementing specific, non-generic computer functions.

In one embodiment, the functionality of such software components of operations management system 102, including the functionality for identifying an optimal AIOps solution to an alert regarding a software development and/or information technology problem, may be embodied in an application specific integrated circuit.

As stated above, AIOps use big data, analytics, and machine learning capabilities to collect and aggregate the huge and ever-increasing volumes of data generated by multiple information technology (IT) infrastructure components, application demands, and performance-monitoring tools, and service ticketing systems. Furthermore, AIOps intelligently shift "signals" out of the "noise" to identify significant events and patterns related to application performance and availability issues. Additionally, AIOps diagnose root causes and report them to IT and DevOps for rapid response and remediation, or, in some cases, automatically resolve these issues without human intervention. Such issues may correspond to ensuring that metrics specified in a service level agreement are met. DevOps integrate and automate the work of software development (Dev) and IT operations (Ops) as a means for improving and shortening the systems development life cycle. Currently, issues needing to be addressed, usually reported via alerts, are handled automatically via the system, which will resolve the alerts via defined steps, or, alternatively, are handled by a human DevOps engineer following a runbook. A runbook is a set of standardized written procedures for completing repetitive information technology (IT) processes within a company. Runbooks provide IT teams with contextual documents that increase consistency and efficiency through standardization. They act as a walkthrough or step-by-step guide for both new and experienced IT professionals within the team. Unfortunately, the resolution of such alerts via such means (human DevOps engineer and automated system) may not provide the fastest, best case resolution of the alerts in the AIOps operations life cycle, such as ensuring that metrics specified in the service level agreement are met.

Figure 4:
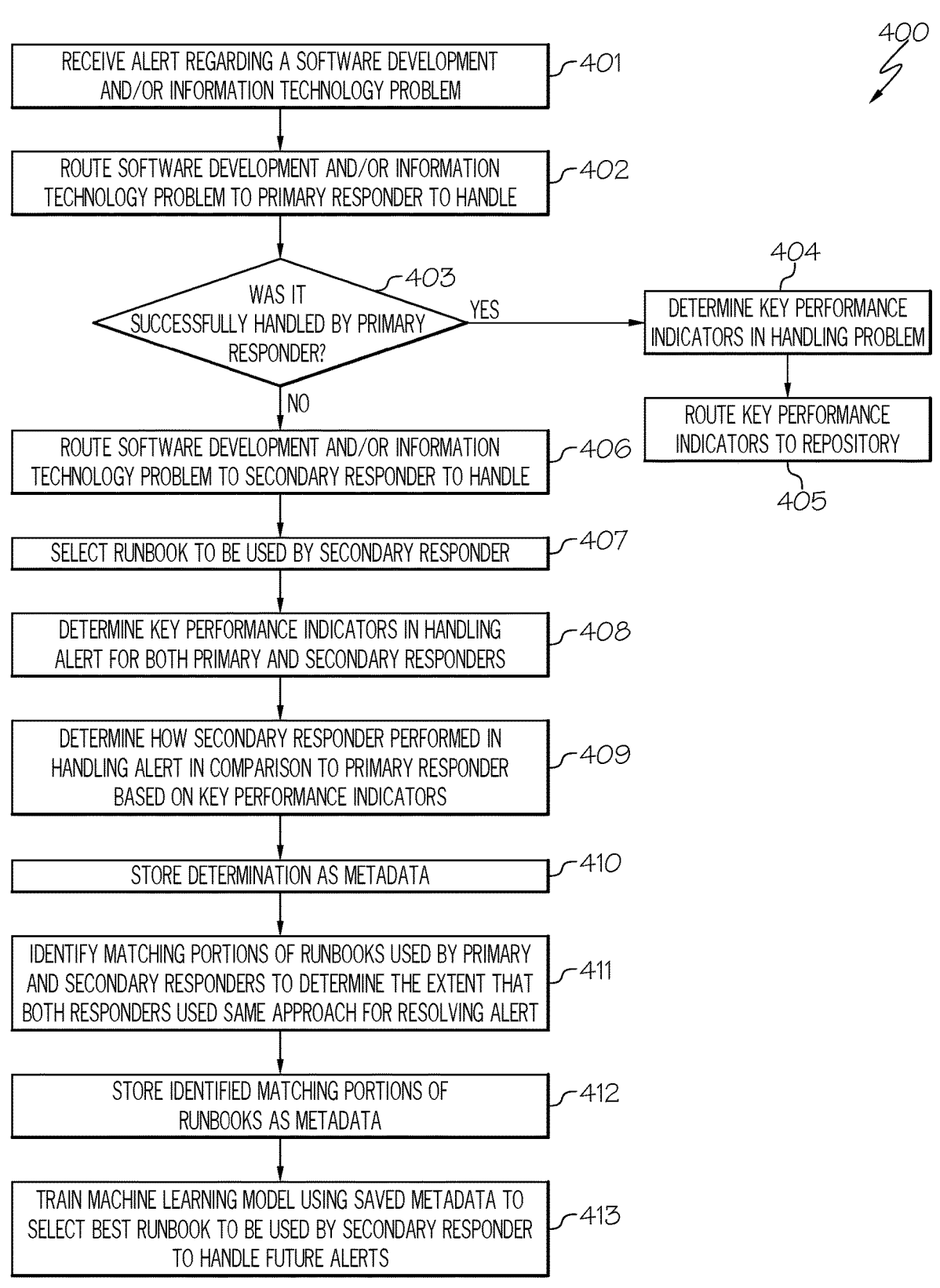
FIG. 4 is a flowchart of a method for identifying an optimal AIOps solution to an alert regarding a software development and/or information technology problem in accordance with an embodiment of the present disclosure.

The embodiments of the present disclosure provide a means for providing the fastest, best case resolution of the alerts in the AIOps operations life cycle by resolving issues, such as software development and/or information technology problems, by bots based on key performance indicators as discussed below in connection with FIGS. 4-7. FIG. 4 is a flowchart of a method for identifying an optimal AIOps solution to an alert regarding a software development and/or information technology problem. FIG. 5 is a flowchart of a method for identifying the matching portions of the runbooks used by the primary and secondary responders. FIG. 6 is a flowchart of a method for illustrating the matching code in the runbooks used by the primary and secondary responders. FIG. 7 is a flowchart of a method for selecting a runbook to be utilized by the secondary responder using a trained machine learning model.

As stated above, FIG. 4 is a flowchart of a method 400 for identifying an optimal AIOps solution to an alert regarding a software development and/or information technology problem in accordance with an embodiment of the present disclosure.

Referring to FIG. 4, in conjunction with FIGS. 1-3, in operation 401, routing engine 201 of operations management system 102 receives an alert regarding a software development and/or information technology problem, such as a DevOps problem or a site reliability engineer problem. Examples of such software development and/or information technology problems include software requirements, security breaches, software bugs, slow performance, overheating, slow Internet connection, etc.

As discussed above, in one embodiment, an alert is generated by alert monitoring system 106 based on changes in metric values pertaining to a software development and/or information technology problem, such as exceeding or not exceeding a metric specified in a service level agreement.

As also stated above, alert monitoring system 106 is configured to monitor events that occur in the system, including data sources 104, being managed by operations management system 102. In one embodiment, such events may correspond to changes in metric values, such as exceeding or not exceeding a metric specified in a service level agreement. In one embodiment, alert monitoring system 106 is configured to generate an alert based on such monitored events, such as when such events indicate a change in a metric value exceeding or not exceeding a metric specified in a service level agreement. In one embodiment, such events to be monitored as well as the change in metric values associated with such events that should generate an alert by alert monitoring system 106 are stored in a data structure (e.g., table). Based on the events listed in such a data structure, alert monitoring system 106 monitors for such events, including changes in the metric values associated with such events that should generate an alert by alert monitoring system 106 as specified in the data structure. In one embodiment, such a data structure resides within a storage device of alert monitoring system 106. In one embodiment, such a data structure is populated by an expert.

In operation 402, routing engine 201 of operations management system 102 routes the alert regarding the software development and/or information technology problem to the primary responder (e.g., DevOps engineer, such as the user of computing device 101) to handle.

In operation 403, routing engine 201 of operations management system 102 determines if the alert was successfully handled by the primary responder. That is, routing engine 201 determines whether the software development and/or information technology problem associated with the alert was successfully handled by the primary responder. "Successfully handled," as used herein, refers to resolving the alert, such as addressing the software development and/or information technology problem in a manner that causes alert monitoring system 106 to withdraw the alert.

If the alert was successfully handled by the primary responder, then, in operation 404, measurement engine 202 of operations management system 102 determines the key performance indicators in handling the software development and/or information technology problem. A key performance indicator, as used herein, is a quantifiable measure of performance over time for a specific objective. Examples of key performance indicators determined by measurement engine 202 is discussed below.

As stated above, for example, measurement engine 202 identifies the resolution time for resolving the alert regarding a software development and/or information technology problem. In one embodiment, the resolution time corresponds to the time from when the alert was initiated until the time that the alert regarding a software development and/or information technology problem was resolved.

In another example, measurement engine 202 identifies the handling time for the duration of time it took in selecting the correct runbook to resolve the alert regarding a software development and/or information technology problem and the time taken to run commands from the runbook to correct the software development and/or information technology problem.

In a further example, measurement engine 202 identifies the accuracy (accuracy rating) in terms of identifying the percentage of times the selected first runbook is the correct runbook for resolving the alert regarding a software development and/or information technology problem. In one embodiment, such a percentage may correspond to the number of times the correct runbook was utilized divided by the number of times the recommendations were made (number of times a runbook was selected to address the alert).

In another example, measurement engine 202 identifies the percentage of times the selected runbook avoids escalations (an increase in seriousness in the software development and/or information technology problem) corresponding to the escalation avoidance rate. In one embodiment, such a percentage may correspond to the number of times the selected runbook avoided escalations divided by the number of times the recommendations were made (number of times a runbook was selected to address the alert).

In one embodiment, measurement engine 202 utilizes various software tools for identifying the key performance indicators in handling the alert regarding a software development and/or information technology problem, which can include, but are not limited to, Domo®, Tableau®, Klipfolio®, Databox®, etc.

In operation 405, measurement engine 202 of operations management system 102 routes the key performance indicators (key performance indicators determined in operation 404) to repository 105, which will later be used in connection with training a machine learning model to select the best runbook for the secondary responder to utilize in handling a specific alert.

If, however, the alert was not successfully handled by the primary responder, then, in operation 406, routing engine 201 of operations management system 102 routes the alert regarding the software development and/or information technology problem to the secondary responder (e.g., bot) to handle.

In operation 407, runbook selector engine 203 of operations management system 102 selects the runbook to be used by the secondary responder (e.g., bot) to handle the alert regarding the software development and/or information technology problem.

As discussed above, in one embodiment, runbook selector engine 203 summarizes the text in the runbooks stored in repositor 105 using natural language processing. In one embodiment, runbook selector engine 203 identifies the frequency of all the words in the runbooks and stores the text data and its frequency in a dictionary. The sentences which contain a number of frequency words that exceeds a threshold value, which may be user-designated, is kept in the final summary.

In one embodiment, runbook selector engine 203 creates context tags for the summarized text in the runbooks used by the primary and secondary responders, where such context tags provide information about the context of the code being executed in the runbooks. In one embodiment, such context tags are assigned automatically based on identifying keywords in the runbooks that are associated with context tags as specified in a data structure (e.g., table). For example, such a data structure may include a listing of keywords and their associated context tags. For instance, the keyword "console" or "GUI" may be associated with the context tag of "console." In another example, the keyword "setup" may be associated with the context tag of "setup." In a further example, the keyword "REST" may be associated with the context tag of "REST."

In one embodiment, runbook selector engine 203 selects the runbook to be used by the secondary responder (e.g., bot) based on identifying the runbook with the greatest number of context tags that match the metadata of the alert.

In one embodiment, alert monitoring system 106 is configured to generate metadata associated with the alert, such as instrumentation data, environmental data, continuous integration/continuous deployment (CI/CD) performance, version control in test automation, security issues, etc. In one embodiment, such metadata is provided to operations management system 102 and stored in a storage device (e.g., storage device 311, 315) of operations management system 102. In one embodiment, such metadata is used to identify the runbook with the greatest number of context tags that match the metadata of the alert.

In operation 408, measurement engine 202 of operations management system 102 determines the key performance indicators in handling the alert for both the primary and secondary responders regarding the software development and/or information technology problem in the same manner as discussed above in connection with operation 404.

In operation 409, comparison module 204 of operations management system 102 determines how the secondary responder (e.g., bot) performed in handling the alert regarding a software development and/or information technology problem in comparison to the primary responder (e.g., DevOps engineer, such as the user of computing device 101) based on the key performance indicators.

For example, such key performance indicators for the primary responder may indicate a case resolution time of 5.22 seconds, a handling time of 4 seconds, an accuracy rating of 42%, and an escalation avoidance rate of 80%. Furthermore, in connection with the same example, the key performance indicators for the secondary responder may indicate a case resolution time of 3.22 seconds, a handling time of 2 seconds, an accuracy rating of 62%, and an escalation avoidance rate of 82%.

As stated above, in one embodiment, after computing such key performance indicators, measurement engine 202 routes such key performance indicators to repository 105.

In one embodiment, such key performance indicators for the primary and secondary responders are compared against one another by comparison module 204. In one embodiment, based on the optimal values for such key performance indicators as established by an expert in a data structure (e.g., table), which may be stored in a storage device (e.g., storage device 311, 315) of operations management system 102, comparison module 204 determines how the secondary responder performs in handling the alert in comparison to the primary responder.

In one embodiment, comparison module 204 compares the key performance indicators of the primary and secondary responders by dividing the nominal value of the key performance indicator in question for the secondary responder with respect to the nominal value of the same key performance indicator for the primary responder resulting in a "comparison value." In one embodiment, the nominal values for such key performance indicators for the primary and secondary responders may then be compared with the optimal values for such key performance indicators as stored in the data structure discussed above. If the optimal value for such a key performance indicator is greater than the values of the key performance indicator for the primary and secondary responders and if the comparison value is greater than 1, then the secondary responder is deemed to have performed better than the primary responder for such a key performance indicator. Otherwise, the primary responder is deemed to have performed better than the secondary responder for such a key performance indicator. If the optimal value for such a key performance indicator is less than the values of the key performance indicator for the primary and secondary responders and if the comparison value is greater than 1, then the primary responder is deemed to have performed better than the secondary responder for such a key performance indicator. Otherwise, the secondary responder is deemed to have performed better than the primary responder for such a key performance indicator.

Furthermore, in one embodiment, comparison module 204 determines whether the primary or secondary responder performed better with respect to a key performance indicator based on which value of the key performance indicator for the primary and secondary responders is closest to the optimal value of the key performance indicator as stored in the data structure discussed above. Whichever value of the key performance indicator for the primary and secondary responders is closest to the optimal value of the key performance indicator, such a responder is deemed to have performed better with respect to such a key performance indicator.

In one embodiment, comparison module 204 utilizes various software tools for determining how the secondary responder performed in handling the alert regarding a software development and/or information technology problem in comparison to the primary responder based on the key performance indicators, which can include, but are not limited to, Domo®, Tableau®, Klipfolio®, Databox®, etc.

In operation 410, comparison module 204 of operations management system 102 stores the results of the determination of operation 409 as metadata, such as in repository 105.

In operation 411, matching engine 205 of operations management system 102 identifies the matching portions of the runbooks used by the primary and secondary responders to determine the extent that both responders used the same approach for resolving the alert regarding a software development and/or information technology problem.

A discussion regarding identifying matching portions of the runbooks used by the primary and secondary responders is provided below in connection with FIG. 5.

FIG. 5 is a flowchart of a method 500 for identifying the matching portions of the runbooks used by the primary and secondary responders in accordance with an embodiment of the present disclosure.

Referring to FIG. 5, in conjunction with FIGS. 1-4, in operation 501, matching engine 205 of operations management system 102 summarizes the text in the runbooks used by the primary and secondary responders using natural language processing.

As discussed above, in one embodiment, matching engine 205 identifies the frequency of all the words in the runbooks and stores the text data and its frequency in a dictionary. The sentences which contain a number of frequency words that exceeds a threshold value, which may be user-designated, is kept in the final summary.

In operation 502, matching engine 205 of operations management system 102 creates context tags for the summarized text in the runbooks used by the primary and secondary responders, where such context tags provide information about the context of the code being executed in the runbooks.

As stated above, in one embodiment, such context tags are assigned automatically based on identifying keywords in the runbooks that are associated with context tags as specified in a data structure (e.g., table). For example, such a data structure may include a listing of keywords and their associated context tags. For instance, the keyword "console" or "GUI" may be associated with the context tag of "console." In another example, the keyword "setup" may be associated with the context tag of "setup." In a further example, the keyword "REST" may be associated with the context tag of "REST."

In operation 503, matching engine 205 of operations management system 102 identifies the portions of the runbooks used by the primary and secondary responders that match based on matching the context tags in the summarized text of the runbooks.

Alternatively, in one embodiment, matching engine 205 identifies the matching portions of the runbooks used by the primary and secondary responders to determine the extent that both responders used the same approach for resolving the alert as well as to identify the differences in the approaches that allowed the secondary responder to successfully handle the alert by vectorizing the runbooks used by the primary and secondary responders. The matching portions of the runbooks used by the primary and secondary responders, as used herein, refer to the portions of the runbooks used by the primary and secondary responders that are within a threshold degree of similarity, which may be user-designated. In one embodiment, such a similarity may be determined by vectorizing the runbooks used by the primary and secondary responders. After being converted into real-valued vectors, a similarity measure, such as cosine similarity or the Euclidean distance, may be used to determine the similarity between the code of the runbooks. Such a similarity measure is compared to a threshold value, which may be user-designated, to determine if the portions of the runbooks used by the primary and secondary responders are within a threshold degree of similarity to one another. If the similarity measure exceeds such a threshold value, then the portions of the runbooks used by the primary and secondary responders are deemed to be within a threshold degree of similarity. Otherwise, the portions of the runbooks used by the primary and secondary responders are not deemed to be within a threshold degree of similarity "Cosine similarity," as used herein, refers to a measure of similarity between two non-zero vectors defined in an inner product space. Cosine similarity is the cosine of the angle between the vectors. That is, it is the dot product of the vectors divided by the product of their lengths. If the measurement exceeds a threshold value, which may be user-designated, then the portions of the runbooks used by the primary and secondary responders are deemed to be within a threshold degree of similarity. Otherwise, the portions of the runbooks used by the primary and secondary responders are not deemed to be within a threshold degree of similarity.

In one embodiment, the Euclidean distance is calculated as the square root of the sum of the squared differences between the two feature vectors. If the distance exceeds a threshold value, which may be user-designated, then the portions of the runbooks used by the primary and secondary responders are deemed to be within a threshold degree of similarity. Otherwise, the portions of the runbooks used by the primary and secondary responders are not deemed to be within a threshold degree of similarity.

Returning to FIG. 4, in conjunction with FIGS. 1-3 and 5, in operation 412, comparison module 204 of operations management system 102 stores the results of identifying matching portions as well as non-matching portions of the runbooks as metadata, such as in repository 105.

In one embodiment, such matching portions of the runbooks used by the primary and secondary responders corresponding to the matching code in the runbooks may be illustrated as discussed below in connection with FIG. 6.

FIG. 6 is a flowchart of a method 600 for illustrating the matching code in the runbooks used by the primary and secondary responders in accordance with an embodiment of the present disclosure.

Referring to FIG. 6, in conjunction with FIGS. 1-5, in operation 601, as discussed above in connection with operation 411 of FIG. 4, matching engine 205 of operations management system 102 determines the portions of the runbook used by the secondary responder that match the portions of the runbook used by the primary responder. Such matching portions correspond to the matching code in the runbooks.

In operation 602, map creator engine 206 of operations management system 102 creates a heat map and/or a color code map to represent the matching code and the non-matching code in the runbooks used by the primary and secondary responders.

As discussed above, in one embodiment, map creator engine 206 utilizes hex color codes in Python® for creating the heat map and/or the color code map. Such hex color codes are associated with colors corresponding to the degree that the portions of the runbooks used by the primary and secondary responders match and not match. Such a degree may be established by the similarity measure. For example, the darker shade of red may indicate a high degree of matching; whereas, a darker shade of blue may indicate a low degree of matching.

Returning to FIG. 4, in conjunction with FIGS. 1-3 and 5-6, in operation 413, machine learning engine 207 of operations management system 102 trains a machine learning model using the saved metadata to select the best runbook to be used by the secondary responder to handle future alerts based on the metadata of the alert. The "best" runbook, as used herein, refers to the runbook that was deemed by the machine learning model to be the most appropriate runbook to be utilized by a responder (e.g., secondary responder) to handle an alert.

As stated above, in one embodiment, machine learning engine 207 builds and trains a machine learning model to select the best runbook to be used by the secondary responder (e.g., bot) to handle future alerts based on the metadata of the alert.

In one embodiment, the machine learning model is trained to select the best runbook to be used by the secondary responder (e.g., bot) to handle future alerts based on a sample data set that includes a selected runbook with context tags matching metadata of an alert (alert for a particular software development and/or information technology problem) based on the metadata for how the secondary responder performed in handling the alert in comparison to the primary responder, the metadata for the matching and non-matching portions of the runbooks used by the primary and secondary responders to resolve the alert regarding a software development and/or information technology problem, and the metadata of the alert regarding the software development and/or information technology problem. Such a sample data set may be stored in a data structure (e.g., table) residing within the storage device (e.g., storage device 311, 315) of operations management system 102. In one embodiment, such a data structure is populated by an expert.

Furthermore, in one embodiment, the sample data set discussed above is referred to herein as the "training data," which is used by a machine learning algorithm to make predictions or decisions as to the runbook to be selected to be used by the secondary responder to handle a received alert regrading a software development and/or information technology problem. The algorithm iteratively makes predictions on the training data as to the runbook to be selected to be used by the secondary responder to handle a received alert regrading a software development and/or information technology problem until the predictions achieve the desired accuracy as determined by an expert. Examples of such learning algorithms include nearest neighbor, Naïve Bayes, decision trees, linear regression, support vector machines, and neural networks.

Upon training the machine learning model, the trained machine learning model is used by runbook selector engine 203 to identify a runbook to be used by the secondary responder (e.g., bot) to handle a new alert based on the metadata of the alert as discussed below in connection with FIG. 7.

FIG. 7 is a flowchart of a method 700 for selecting a runbook to be utilized by the secondary responder using a trained machine learning model in accordance with an embodiment of the present disclosure.

Referring to FIG. 7, in conjunction with FIGS. 1-6, in operation 701, routing engine 201 of operations management system 102 receives an alert regarding a software development and/or information technology problem, such as a DevOps problem or a site reliability engineer problem. Examples of such software development and/or information technology problems include software requirements, security breaches, software bugs, slow performance, overheating, slow Internet connection, etc.

As discussed above, in one embodiment, alert monitoring system 106 is configured to generate metadata associated with the alert, such as instrumentation data, environmental data, continuous integration/continuous deployment (CI/CD) performance, version control in test automation, security issues, etc. In one embodiment, such metadata is provided to operations management system 102 and stored in a storage device (e.g., storage device 311, 315) of operations management system 102.

In operation 702, runbook selector engine 203 of operations management system 102 identifies the runbook to be used by the secondary responder to handle the received alert using the trained machine learning model based on the metadata of the alert which is used by the machine learning model to identify the appropriate runbook for the secondary responder to utilize to handle the received alert.

As a result of the foregoing, the principles of the present disclosure identify an optimal AIOps solution in terms of the rules specified in appropriately selected runbooks for resolving issues, such as software development and/or information technology problems.

Furthermore, the principles of the present disclosure improve the technology or technical field involving artificial intelligence for information technology operations (AIOps).

As discussed above, AIOps use big data, analytics, and machine learning capabilities to collect and aggregate the huge and ever-increasing volumes of data generated by multiple information technology (IT) infrastructure components, application demands, and performance-monitoring tools, and service ticketing systems. Furthermore, AIOps intelligently shift "signals" out of the "noise" to identify significant events and patterns related to application performance and availability issues. Additionally, AIOps diagnose root causes and report them to IT and DevOps for rapid response and remediation, or, in some cases, automatically resolve these issues without human intervention. Such issues may correspond to ensuring that metrics specified in a service level agreement are met. DevOps integrate and automate the work of software development (Dev) and IT operations (Ops) as a means for improving and shortening the systems development life cycle. Currently, issues needing to be addressed, usually reported via alerts, are handled automatically via the system, which will resolve the alerts via defined steps, or, alternatively, are handled by a human DevOps engineer following a runbook. A runbook is a set of standardized written procedures for completing repetitive information technology (IT) processes within a company. Runbooks provide IT teams with contextual documents that increase consistency and efficiency through standardization. They act as a walkthrough or step-by-step guide for both new and experienced IT professionals within the team.

Unfortunately, the resolution of such alerts via such means (human DevOps engineer and automated system) may not provide the fastest, best case resolution of the alerts in the AIOps operations life cycle, such as ensuring that metrics specified in the service level agreement are met.

Embodiments of the present disclosure improve such technology by routing an alert to resolve a software development and/or information technology problem to a secondary responder (e.g., bot) to handle after a primary responder (e.g., human DevOps engineer) failed to resolve the alert. In one embodiment, a runbook is selected to be used by the secondary responder to handle such an alert based on identifying the runbook with the greatest number of context tags that match the metadata of the alert. Key performance indicators in handling the alert for both the primary and secondary responders may then be determined. A key performance indicator, as used herein, is a quantifiable measure of performance over time for a specific objective. Examples of key performance indicators include case resolution time, a percentage of times a first selected runbook correctly resolved the problem ("accuracy"), a time it took to implement a correct runbook to resolve the problem ("wait time"), an amount of time it took in selecting a correct runbook to resolve the problem and the time taken to run the commands from the runbook to resolve the problem ("handling time"), a percentage of times a selected runbook avoided escalations, etc. A determination is then made as to how the secondary responder (e.g., bot) performed in handling the alert regarding a software development and/or information technology problem in comparison to the primary responder (e.g., human DevOps engineer) based on the key performance indicators. For example, such key performance indicators for the primary responder may indicate a case resolution time of 5.22 seconds, a handling time of 4 seconds, an accuracy rating of 42% and an escalation avoidance rate of 80%. Furthermore, in connection with the same example, the key performance indicators for the secondary responder may indicate a case resolution time of 3.22 seconds, a handling time of 2 seconds, an accuracy rating of 62% and an escalation avoidance rate of 82%. The results of such a determination are stored as metadata, such as in a repository. Furthermore, the matching portions of the runbooks used by the primary and secondary responders are identified to determine the extent that both responders used the same approach for resolving the alert regarding a software development and/or information technology problem. Such identified matching portions may also be stored as metadata. The machine learning model is then trained to select the best runbook to be used by the secondary responder to handle future alerts based on the saved metadata and the metadata (e.g., instrumentation data, environmental data, continuous integration/continuous deployment (CI/CD) performance, version control in test automation, security issues, etc.) of the corresponding alerts. The "best" runbook, as used herein, refers to the runbook that was deemed by the machine learning model to be the most appropriate runbook to be utilized by a responder (e.g., secondary responder) to handle an alert. For example, the metadata of the alert is used by the trained machine learning model to identify the appropriate runbook for the secondary responder to utilize to handle the new incoming alert. In this manner, the optimal AIOps solution for resolving an alert regarding a software development and/or information technology problem is identified. Furthermore, in this manner, there is an improvement in the technical field involving artificial intelligence for information technology operations (AIOps)

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for identifying an artificial intelligence for information technology operations (AIOps) solution for resolving issues, the method comprising:

routing an alert to resolve a software development and/or information technology problem to a secondary responder in response to a primary responder unsuccessfully handling the software development and/or the information technology problem, wherein the primary responder corresponds to a human responder, wherein the secondary responder corresponds to a bot;

determining key performance indicators in handling the software development and/or the information technology problem by the primary and secondary responders;

determining how the secondary responder performed in handling the software development and/or the information technology problem in comparison to the primary responder based on the determined key performance indicators;

storing the determination as a first set of metadata; and training a machine learning model using the first set of metadata to select an appropriate runbook by the secondary responder to handle future software development and/or information technology problems.

2. The method as recited in claim 1, wherein the primary responder and the secondary responder handle the software development and/or information technology problem by selecting a runbook.

3. The method as recited in claim 2 further comprising:

identifying matching and non-matching portions of runbooks used by the primary responder and the secondary responder to determine an extent that the primary responder and the secondary responder used a same approach for resolving the software development and/or the information technology problem;

storing the identified matching and non-matching portions of the runbooks used by the primary responder and the secondary responder as a second set of metadata; and training the machine learning model using the second set of metadata to select the appropriate runbook by the secondary responder to handle future software development and/or information technology problems.

4. The method as recited in claim 3 further comprising:

summarizing text in the runbooks used by the primary and secondary responders using natural language processing;

creating context tags for the summarized text in the runbooks used by the primary and secondary responders, wherein the context tags provide information about a context involving code being executed in the runbooks used by the primary and secondary responders; and identifying portions of the runbooks used by the primary and secondary responders that match based on matching context tags in the summarized text of the runbooks used by the primary and secondary responders.

5. The method as recited in claim 3 further comprising:

creating a heat map and/or a color code map to represent matching code and non-matching code in the runbooks used by the primary responder and the secondary responder.

6. The method as recited in claim 1 further comprising:

receiving a second alert regarding a second software development and/or information technology problem; and identifying a runbook to be used by the secondary responder to handle the second alert regarding the second software development and/or information technology problem using the trained machine learning model.

7. The method as recited in claim 1, wherein the key performance indicators comprise a case resolution time, a percentage of times a first selected runbook correctly resolved a problem, a time it took to implement a correct runbook to resolve a problem, an amount of time it took in selecting a correct runbook and run commands to resolve a problem, and a percentage of times a selected runbook avoided escalations.

8. A computer program product for identifying an artificial intelligence for information technology operations (AIOps) solution for resolving issues, the computer program product comprising one or more computer readable storage mediums having program code embodied therewith, the program code comprising programming instructions for:

routing an alert to resolve a software development and/or information technology problem to a secondary responder in response to a primary responder unsuccessfully handling the software development and/or the information technology problem, wherein the primary responder corresponds to a human responder, wherein the secondary responder corresponds to a bot;

determining key performance indicators in handling the software development and/or the information technology problem by the primary and secondary responders;

determining how the secondary responder performed in handling the software development and/or the information technology problem in comparison to the primary responder based on the determined key performance indicators;

storing the determination as a first set of metadata; and training a machine learning model using the first set of metadata to select an appropriate runbook by the secondary responder to handle future software development and/or information technology problems.

9. The computer program product as recited in claim 8, wherein the primary responder and the secondary responder handle the software development and/or information technology problem by selecting a runbook.

10. The computer program product as recited in claim 9, wherein the program code further comprises the programming instructions for:

identifying matching and non-matching portions of runbooks used by the primary responder and the secondary responder to determine an extent that the primary responder and the secondary responder used a same approach for resolving the software development and/or the information technology problem;

storing the identified matching and non-matching portions of the runbooks used by the primary responder and the secondary responder as a second set of metadata; and training the machine learning model using the second set of metadata to select the appropriate runbook by the secondary responder to handle future software development and/or information technology problems.

11. The computer program product as recited in claim 10, wherein the program code further comprises the programming instructions for:

summarizing text in the runbooks used by the primary and secondary responders using natural language processing;

creating context tags for the summarized text in the runbooks used by the primary and secondary responders, wherein the context tags provide information about a context involving code being executed in the runbooks used by the primary and secondary responders; and identifying portions of the runbooks used by the primary and secondary responders that match based on matching context tags in the summarized text of the runbooks used by the primary and secondary responders.

12. The computer program product as recited in claim 10, wherein the program code further comprises the programming instructions for:

creating a heat map and/or a color code map to represent matching code and non-matching code in the runbooks used by the primary responder and the secondary responder.

13. The computer program product as recited in claim 8, wherein the program code further comprises the programming instructions for:

receiving a second alert regarding a second software development and/or information technology problem; and identifying a runbook to be used by the secondary responder to handle the second alert regarding the second software development and/or information technology problem using the trained machine learning model.

14. The computer program product as recited in claim 8, wherein the key performance indicators comprise a case resolution time, a percentage of times a first selected runbook correctly resolved a problem, a time it took to implement a correct runbook to resolve a problem, an amount of time it took in selecting a correct runbook and run commands to resolve a problem, and a percentage of times a selected runbook avoided escalations.

15. A system, comprising:

a memory for storing a computer program for identifying an artificial intelligence for information technology operations (AIOps) solution for resolving issues; and a processor connected to the memory, wherein the processor is configured to execute program instructions of the computer program comprising:

routing an alert to resolve a software development and/or information technology problem to a secondary responder in response to a primary responder unsuccessfully handling the software development and/or the information technology problem, wherein the primary responder corresponds to a human responder, wherein the secondary responder corresponds to a bot;

determining key performance indicators in handling the software development and/or the information technology problem by the primary and secondary responders;

determining how the secondary responder performed in handling the software development and/or the information technology problem in comparison to the primary responder based on the determined key performance indicators;

storing the determination as a first set of metadata; and training a machine learning model using the first set of metadata to select an appropriate runbook by the secondary responder to handle future software development and/or information technology problems.

16. The system as recited in claim 15, wherein the primary responder and the secondary responder handle the software development and/or information technology problem by selecting a runbook.

17. The system as recited in claim 16, wherein the program instructions of the computer program further comprise:

identifying matching and non-matching portions of runbooks used by the primary responder and the secondary responder to determine an extent that the primary responder and the secondary responder used a same approach for resolving the software development and/or the information technology problem;

storing the identified matching and non-matching portions of the runbooks used by the primary responder and the secondary responder as a second set of metadata; and training the machine learning model using the second set of metadata to select the appropriate runbook by the secondary responder to handle future software development and/or information technology problems.

18. The system as recited in claim 17, wherein the program instructions of the computer program further comprise:

summarizing text in the runbooks used by the primary and secondary responders using natural language processing;

creating context tags for the summarized text in the runbooks used by the primary and secondary responders, wherein the context tags provide information about a context involving code being executed in the runbooks used by the primary and secondary responders; and identifying portions of the runbooks used by the primary and secondary responders that match based on matching context tags in the summarized text of the runbooks used by the primary and secondary responders.

19. The system as recited in claim 17, wherein the program instructions of the computer program further comprise:

creating a heat map and/or a color code map to represent matching code and non-matching code in the runbooks used by the primary responder and the secondary responder.

20. The system as recited in claim 15, wherein the program instructions of the computer program further comprise:

receiving a second alert regarding a second software development and/or information technology problem; and identifying a runbook to be used by the secondary responder to handle the second alert regarding the second software development and/or information technology problem using the trained machine learning model.

\* \* \* \* \*